United States Patent
Kim et al.

(10) Patent No.: US 11,555,342 B2
(45) Date of Patent: Jan. 17, 2023

(54) PROFILE LEARNING SYSTEM AND PROFILE LEARNING METHOD FOR COOPERATIVE CONTROL OF DUAL ACTUATOR APPLIED TO OPPOSITE SLIDING DOORS

(71) Applicants: Hyundai Motor Company, Seoul (KR); Kia Motors Corporation, Seoul (KR)

(72) Inventors: Jun-Hyuk Kim, Seongnam-si (KR); Bon-Hyeok Ku, Hwaseong-si (KR); Hyung-In Yun, Seoul (KR); Chung-Sik Yim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 357 days.

(21) Appl. No.: 17/021,817

(22) Filed: Sep. 15, 2020

(65) Prior Publication Data
US 2021/0355728 A1 Nov. 18, 2021

(30) Foreign Application Priority Data

May 18, 2020 (KR) .......................... 10-2020-0058898

(51) Int. Cl.
*E05F 15/638* (2015.01)
*E05D 15/06* (2006.01)
(Continued)

(52) U.S. Cl.
CPC ........ *E05D 15/0604* (2013.01); *E05C 19/005* (2013.01); *G06N 20/00* (2019.01); *E05F 15/638* (2015.01); *H02P 5/00* (2013.01)

(58) Field of Classification Search
None
See application file for complete search history.

(56) References Cited

U.S. PATENT DOCUMENTS

2013/0123056 A1* 5/2013 Ishida .................... E05F 15/646
475/149
2016/0201377 A1* 7/2016 Nishikibe ............... E05F 15/44
49/28
(Continued)

FOREIGN PATENT DOCUMENTS

KR 10-1684536 B1 12/2016
KR 10-1988953 B1 6/2019

*Primary Examiner* — Xuyang Xia
(74) *Attorney, Agent, or Firm* — Morgan, Lewis & Bockius LLP

(57) ABSTRACT

A profile learning system for cooperative control of a dual actuator applied to opposite sliding doors may include a first position sensor configured to detect a position of a door that operates in a first direction along a rail; a spindle assembly including a spindle that operates in a second direction with respect to the door to prevent the door from rattling; first and second motors engaged to the door and the spindle assembly and configured to provide driving power to the door and the spindle assembly, respectively; a memory unit configured to store the position of the door; and a control unit configured to adjust an output of the second motor configured for a predetermined time period and to determine learning success or learning failure for complete opening or closing of the door based on the position of the door when a stall state is detected due to a difference in stroke between the first motor and the second motor.

15 Claims, 8 Drawing Sheets

(51) Int. Cl.
  *G06N 20/00* (2019.01)
  *E05C 19/00* (2006.01)
  *H02P 5/00* (2016.01)

(56) References Cited

U.S. PATENT DOCUMENTS

| | | | |
|---|---|---|---|
| 2018/0266159 A1* | 9/2018 | Bito | E05B 85/26 |
| 2019/0145147 A1* | 5/2019 | Takenaka | E05F 15/659 |
| | | | 701/49 |
| 2020/0086893 A1* | 3/2020 | Jarolim | B61D 1/00 |
| 2021/0214989 A1* | 7/2021 | Linden | B60J 5/0473 |

* cited by examiner

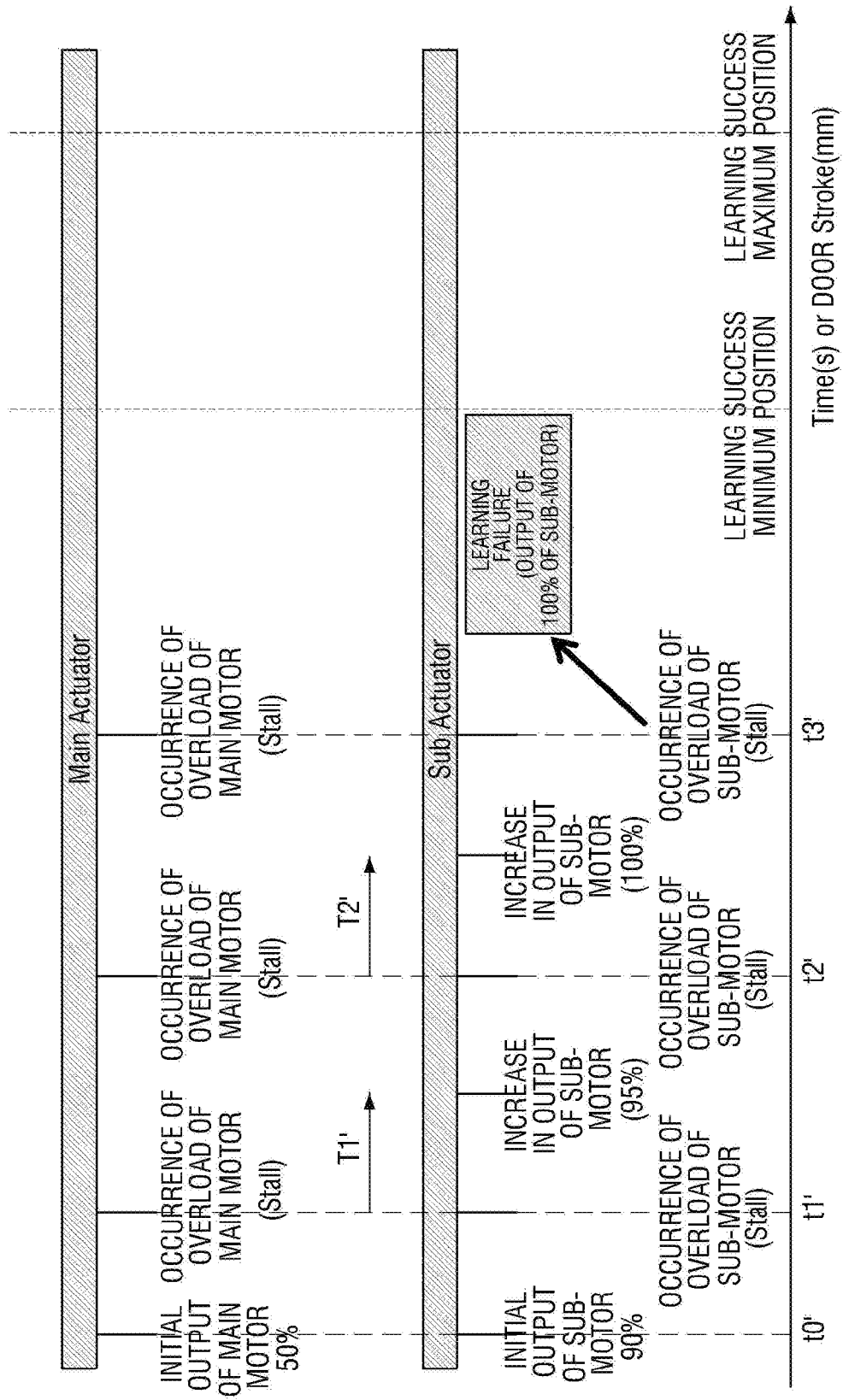

PROFILE LEARNING SYSTEM AND PROFILE LEARNING METHOD FOR COOPERATIVE CONTROL OF DUAL ACTUATOR APPLIED TO OPPOSITE SLIDING DOORS

CROSS-REFERENCE TO RELATED APPLICATIONS

The present application claims priority to Korean Patent Application No. 10-2020-0058898, filed on May 18, 2020, the entire contents of which is incorporated herein for all purposes by this reference.

BACKGROUND OF THE INVENTION

Field of the Invention

The present invention relates to a profile learning system and a profile learning method for cooperative control of a dual actuator applied to opposite sliding doors, and more particularly, to a profile learning system and a profile learning method capable of performing learning for complete opening or closing of doors by cooperative control of actuators which operate in opposite directions with respect to the doors.

Description of Related Art

In general, a vehicle has an occupant compartment having a predetermined size in which a driver or an accompanied occupant may be accommodated, and occupant compartment opening/closing doors are mounted on a vehicle body to open or close the occupant compartment.

Sliding type occupant compartment opening/closing doors include a front sliding door mounted at a front side in a longitudinal direction of a vehicle and a rear sliding door mounted at a rear side in the longitudinal direction of the vehicle. The front sliding door and the rear sliding door are typically configured to be moved along rails mounted on a vehicle body or the doors.

However, the sliding type occupant compartment opening/closing door in the related art requires three rails (an upper rail, a center rail, and a lower rail) that support an upper portion, a middle portion, and a lower portion of the door, respectively, during the process of opening or closing the door, and the sliding type occupant compartment opening/closing door also requires components related to the rails. For the present reason, the sliding type occupant compartment opening/closing door in the related art has a problem in that the weight of the vehicle and the number of components are increased and a degree of freedom of design of the vehicle deteriorates.

Therefore, there has been developed a two-rail type door system for a vehicle in which a sliding door is slidably supported only with center portion and lower rails. For example, Korean Patent No. 10-1684536 (Sliding Door System for Vehicle) in the related art includes that a door rail (i.e., a center rail) is mounted on a sliding door, a vehicle body rail (i.e., a lower rail) is mounted on a vehicle body, and the sliding door is opened or closed as a center slider coupled to the door rail and a lower slider coupled to the vehicle body rail are moved.

However, in the sliding structure in the related art, two support points at which the sliding door is supported are provided in an up and down direction, and as a result, there is a problem in that the door is moved about an imaginary axis running through the support points.

Meanwhile, recently, there has been introduced a technology of mounting the sliding door on the vehicle body in an automatic opening/closing manner rather than a manual opening/closing manner. This is a technology that automatically opens or closes the door by operating an actuator. For example, Korean Patent No. 10-1988953 (Powered Sliding Door Device) includes a technology in an automatic opening/closing manner.

To prevent the movement of the door, a main actuator and a sub-actuator may be used for the vehicle provided with the automatically openable/closable sliding door. The main actuator is for opening the door, and the sub-actuator is for preventing the movement of the door by applying an external force to the door.

In the instant case, the two actuators operate in the opposite directions because the main actuator operates in a longitudinal direction (T direction) of the vehicle and the sub-actuator operates in a width direction (L direction) of the vehicle. In the instant case, a stall state may occur as the two actuators act as mechanical loads against each other, and in the stall state, the door cannot be completely opened or closed. Accordingly, there is a demand for a technology configured for performing learning to completely open or close the door by performing cooperative control of the dual actuator applied to the opposite sliding doors.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a new type of invention configured for implementing a learning logic that enables complete opening or closing of a door by controlling an output of a dual actuator in a vehicle provided with opposite sliding doors.

A profile learning system for cooperative control of a dual actuator applied to opposite sliding doors according to various exemplary embodiments of the present invention may include a first position sensor configured to detect a position of a door that operates in a first direction along a rail; a spindle assembly including a spindle that operates in a second direction with respect to the door to prevent the door from rattling; first and second motors engaged to the door and the spindle assembly and configured to provide driving power to the door and the spindle assembly, respectively; a memory unit configured to store the position of the door; and a control unit configured to adjust an output of the second motor for a predetermined time period and to determine learning success or learning failure for complete opening or closing of the door based on the position of the door when a stall state is detected due to a difference in stroke between the first motor and the second motor.

A profile learning method for cooperative control of a dual actuator applied to opposite sliding doors according to various exemplary embodiments of the present invention may include a detecting step of detecting an interference stall state occurring due to a difference in stroke between a first motor configured to provide driving power to a door that operates in a first direction along a rail and a second motor configured to provide driving power to a spindle that operates in a second direction with respect to the door to prevent the door from rattling; an adjustment step of maintaining an output of the first motor for a predetermined time period and adjusting an output of the second motor when the interference stall state is detected; and a determination step of determining success or failure of learning for complete opening or closing of the door based on a position of the door.

According to various exemplary embodiments of the present invention, it is possible to implement the learning logic that enables the complete opening or closing of the door by controlling an output of the actuator even though the actuator for providing driving power for moving the sliding door and the actuator for preventing the movement of the door operate in the opposite directions.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 is a view exemplarily illustrating a learning failure case according to the exemplary embodiment of the present invention.

Figure 1:
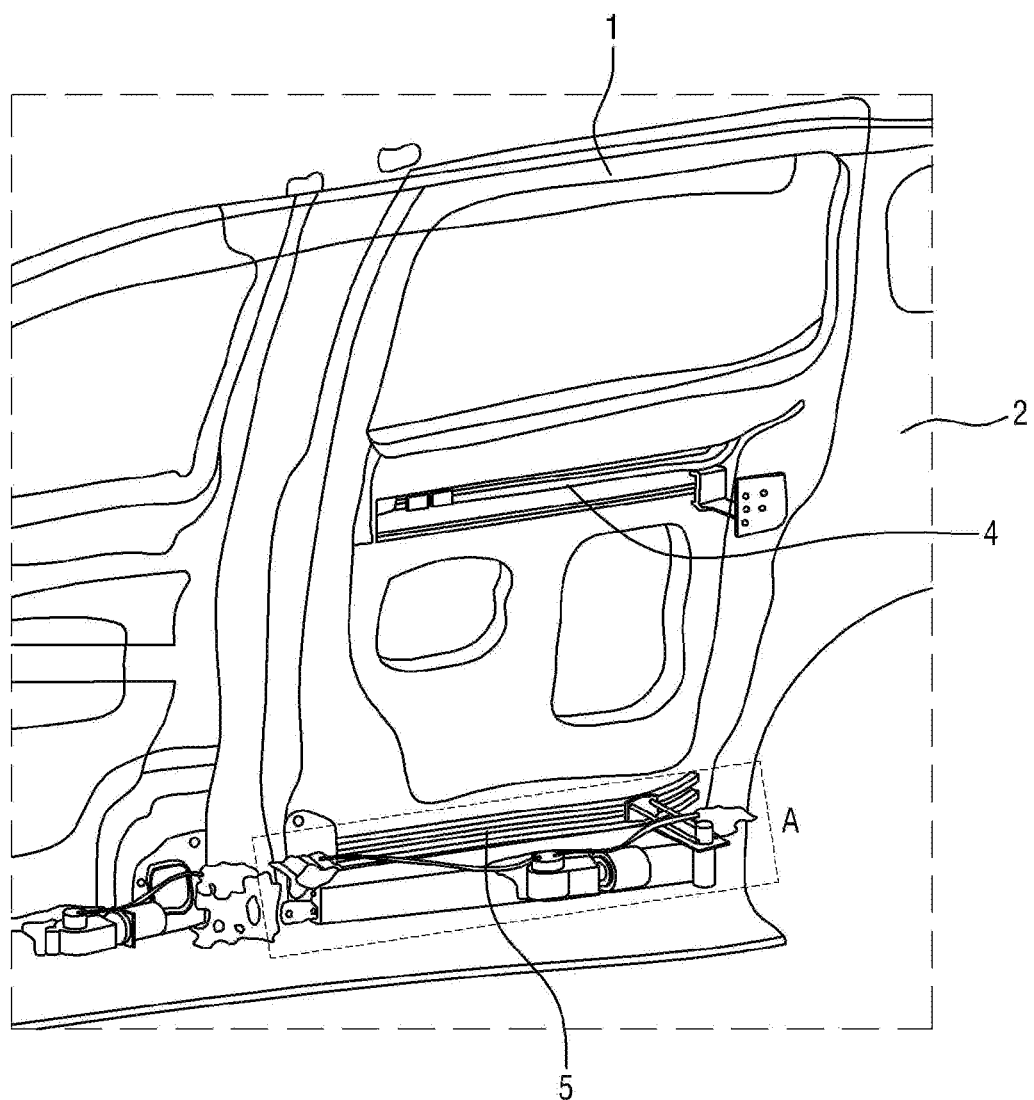
FIG. 1 is a view exemplarily illustrating a structure of opposite sliding doors according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of a profile learning system and a profile learning method for cooperative control of a dual actuator applied to opposite sliding doors according to various exemplary embodiments of the present invention will be described in detail with reference to the drawings. Terms or words used herein may not be interpreted as being limited to a general or dictionary meaning and may be interpreted as a meaning and a concept which conform to the technical spirit of the present invention based on a principle that an inventor can appropriately define a concept of a term to describe his or her own invention by the best method.

Figure 2:
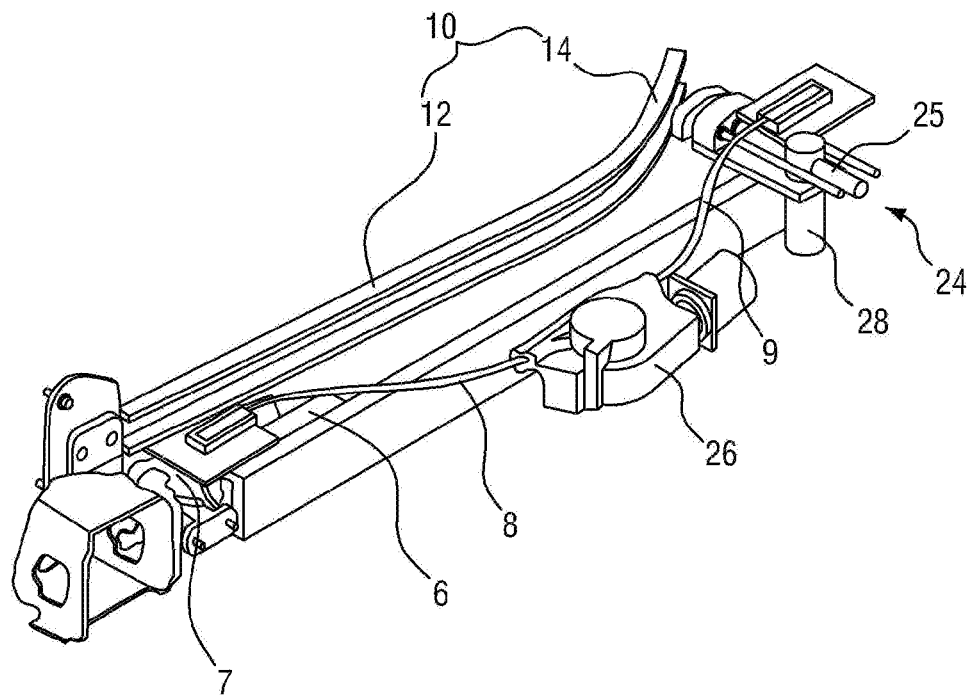
FIG. 2 is an enlarged view of part an in FIG. 1.

FIG. 1 is a view exemplarily illustrating a structure of opposite sliding doors according to various exemplary embodiments of the present invention, and FIG. 2 is an enlarged view of part an in FIG. 1.

Referring to FIG. 1 and FIG. 2, the present invention may be applied to a structure having an actuator for operating opposite sliding doors 1 mounted on a vehicle, and an actuator for preventing a movement of the doors 1. According to the exemplary embodiment of the present invention, the vehicle has only a lower rail 5 (a rail mounted at a lower side of the vehicle) and a center rail 4 (a rail mounted at a center portion of the vehicle), but has no upper rail.

When discussing a mechanism for moving the door 1, one end portion of a lower rail roller unit 6 is inserted into and rollably coupled to the lower rail 5 provided in a longitudinal direction of a vehicle body 2, and a lower rail swing arm 7 is rotatably connected to the door 1 and a lower rail roller unit 6. When a front cable 8 or a rear cable 9 is pulled by a forward or reverse rotation of a first motor 27, i.e., the actuator, the door 1 is moved along the lower rail 5.

When discussing a mechanism for preventing a movement of the door 1, a spindle 25 of a spindle assembly 24, which is provided in a direction toward the door 1, is movably connected to a lower guide rail 10 provided in the longitudinal direction of the vehicle body 2. When the spindle 25 is moved by a forward or reverse rotation of a second motor 28, i.e., the actuator while the door 1 moves, external force is applied to the door 1 such that the movement of the door 1 is prevented. In the instant case, the door 1 is moved in accordance with a shape of the lower guide rail 10. The lower guide rail 10 may include a straight portion 12 having a straight shape, and a curved portion 14 having a curved shape.

In respect to the above-mentioned structure, various embodiments of the present invention relate to a system and a method for determining the success or failure of learning for complete opening or closing of the door 1 by cooperative control of the actuator for operating the door 1 and the actuator for preventing the movement of the door 1.

Figure 3:
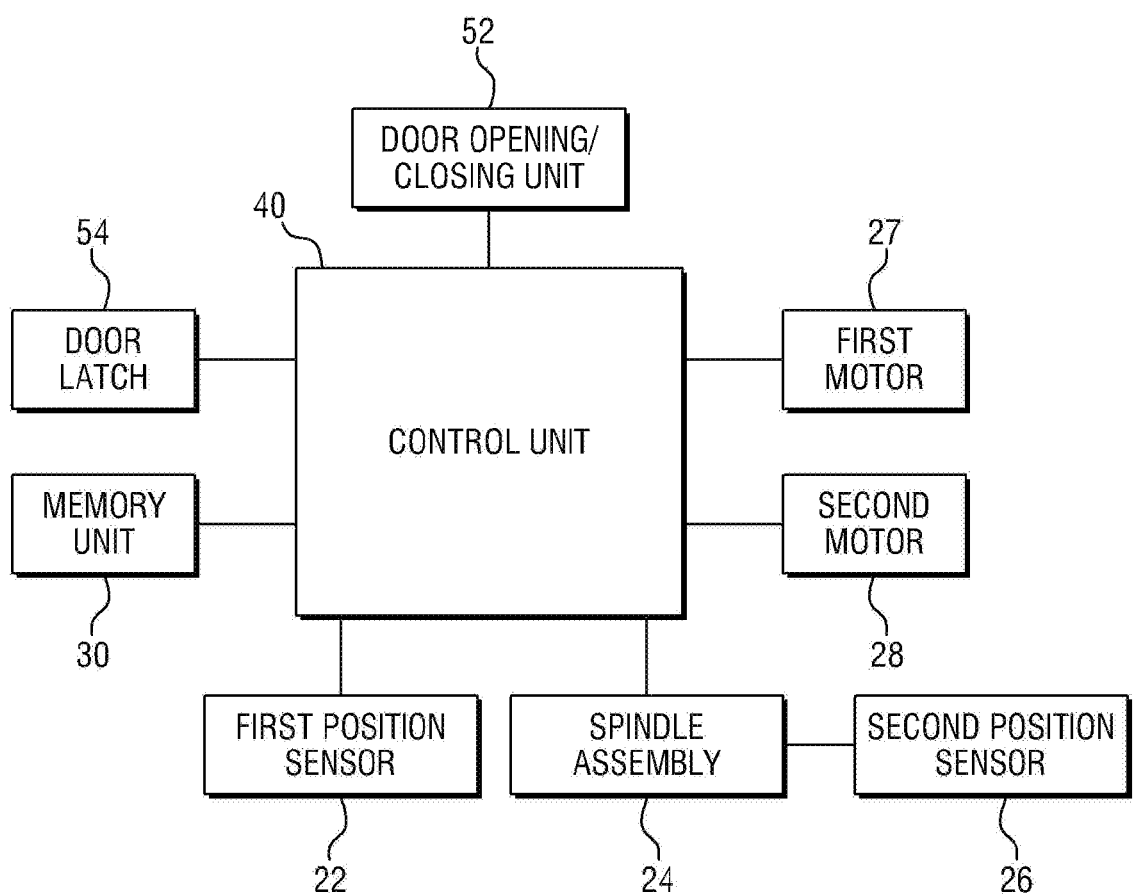
FIG. 3 is a view schematically illustrating a configuration of a profile learning system for cooperative control of a dual actuator applied to opposite sliding doors according to various exemplary embodiments of the present invention.

FIG. 3 is a view schematically illustrating a configuration of a profile learning system for cooperative control of a dual actuator applied to opposite sliding doors according to various exemplary embodiments of the present invention.

Referring to FIG. 3, the profile learning system for cooperative control of the dual actuator applied to the opposite sliding doors according to the exemplary embodiment of the present invention includes a first position sensor 22, the spindle assembly 24, the first motor 27, the second motor 28, a memory unit 30, and a control unit 40.

The first position sensor 22 detects a position of the door 1 that moves in a first direction along the lower rail 5. In the instant case, the first direction means a longitudinal direction of the lower rail 5. The first position sensor 22 is connected to the first motor 27 and may measure the RPM of the first motor 27 to detect the position of the door 1 that moves along the lower rail 5.

One end portion of the spindle assembly 24 is connected to the lower guide rail 10 mounted on the door 1, and the other end portion of the spindle assembly 24 is fixed to the vehicle body 2. The spindle assembly 24 includes the spindle 25, and the spindle 25 may move in an axial direction and operate in a second direction thereof. In the instant case, the second direction means a direction approximately perpendicular to the door 1. The spindle assembly 24 is connected to a second position sensor 26 that detects a position of the spindle 25. The second position sensor 26 may measure the RPM of the second motor 28 to detect the position of the spindle 25.

The first motor 27 is configured to provide driving power to allow the door 1 to move along the lower rail 5. The first motor 27 is connected to the front cable 8 and the rear cable 9 mounted on the vehicle body 2. Therefore, when the front cable 8 or the rear cable 9 is pulled by the forward or reverse rotation of the first motor 27, the door 1 moves in the first direction along the lower rail 5.

The second motor 28 provides driving power to allow the spindle 25 to move. Therefore, the spindle 25 is moved in the second direction by the forward or reverse rotation of the second motor 28.

The memory unit 30 is connected to the control unit 40 and may store data processed by the control unit 40. The memory unit 30 may be, in terms of hardware, a non-volatile memory, such as a ROM, a PROM, an EEPROM, and a flash memory, which retains data even when power is eliminated, but the type of memory is not limited. The memory unit 30 may store information related to positions of the door 1 and the spindle 25 in accordance with the operations of the door 1 and the spindle 25. Furthermore, the memory unit 30 may store information related to a predetermined trajectory of the door.

The control unit 40 receives position information from the first position sensor 22 and the second position sensor 26 and performs a profile learning logic by operating the first motor 27 and the second motor 28. In the instant case, the profile learning logic refers to a logic for controlling the success or failure of learning for the complete opening or closing of the door 1.

The control unit 40 may perform pulse width modulation (PWM) control by applying a variable voltage to adjust the RPM of the first motor 27 and the second motor 28. The control unit 40 may receive information related to electric current generated while the first motor 27 and the second motor 28 operate.

Meanwhile, the control unit 40 is connected to the door opening/closing unit 52 and may receive a door opening/closing signal. Furthermore, the control unit 40 is connected to the door latch 54 and may receive door opening/closing information.

Hereinafter, a criterion for determining a completely opened or closed state of the door 1 by the control unit 40 will be described.

Figure 4:
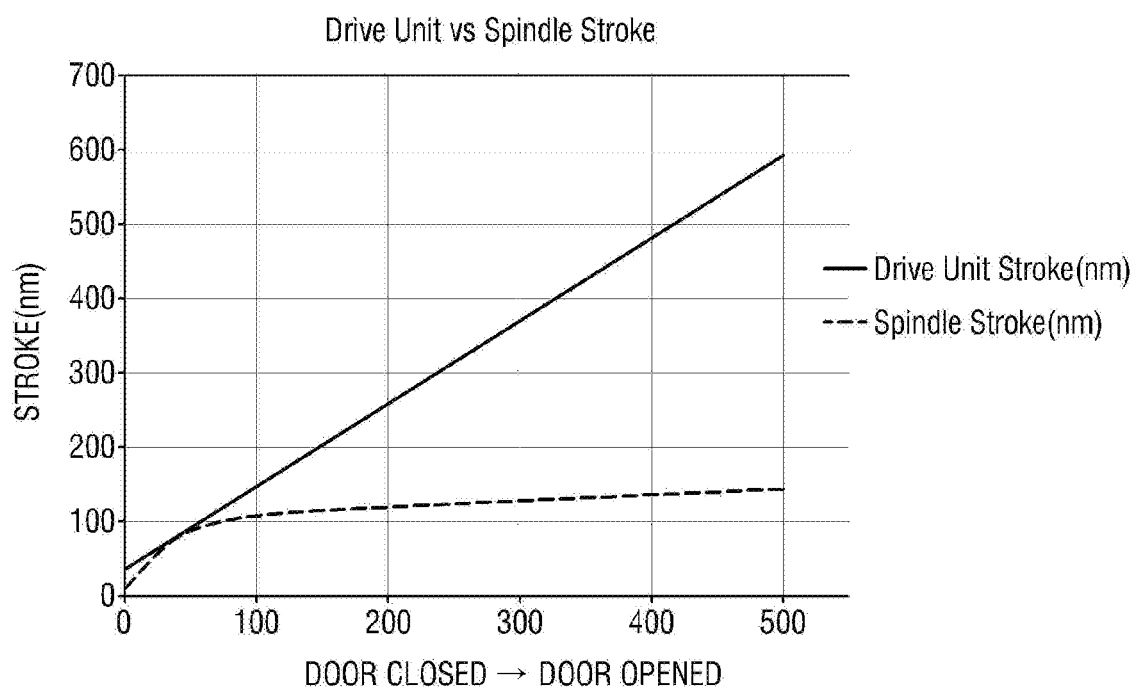
FIG. 4 is a graph illustrating a difference in stroke of the dual actuator according to the exemplary embodiment of the present invention.

FIG. 4 is a graph illustrating a difference in stroke of the dual actuator according to the exemplary embodiment of the present invention.

Referring to FIG. 4, the first motor 27 and the second motor 28 operate while the door 1 switches from the completely opened state to the completely closed state or switches from the completely closed state to the completely opened state. The first motor 27 is a main motor for moving the door 1, the second motor 28 is a sub-motor, and the first motor 27 and the second motor 28 may have different output capacities. In the instant case, because of a difference in stroke (speed) between the first motor 27 and the second motor 28, the first motor 27 and the second motor 28 act as mechanical loads against each other, the first motor 27 and the second motor 28 cannot operate any Furthermore, and thus a stall state may occur.

Furthermore, the present stall state may occur even at a point at which a shape of a trajectory along with the door 1 moves is changed. Therefore, cooperative control of the first motor 27 and the second motor 28 is required to enable the door 1 to switch between the completely opened and completely closed state.

The control unit 40 may divide the positions of the door 1 into an initial position and a final position in accordance with the information related to the trajectory of the lower rail 5 which is stored in the memory unit 30. In the instant case, the initial position refers to the position in the completely opened state (or the position in the completely closed state) of the door 1, and the final position refers to the position in the completely closed state (or the position in the completely opened state) of the door 1. Based on the door opening/closing information for the door latch 54, the control unit 40 may determine whether the initial position is the position in the completely closed state or the position in the completely closed state.

When the door 1 moves from the initial position to the final position by the cooperative control of the first motor 27 and the second motor 27, the control unit 40 may determine that the learning for the complete opening or closing of the door 1 has succeeded. In contrast, when the door 1 cannot reach the final position, the control unit 40 may determine that the learning has failed.

Meanwhile, when the door 1 reaches the final position, the door 1 goes into the completely open or closed state such that the first motor 27 may go into the stall state.

For convenience of differentiation in various exemplary embodiments of the present invention, a stall state caused by a difference in stroke between the first motor 27 and the second motor 28 is referred to as an interference stall state, and a stall state of the first motor 27 at the final position of the door 1 is referred to as a final stall state.

The final position may vary, even for the same type of vehicle, depending on differences in design and manufacture. Therefore, in the exemplary embodiment of the present invention, a learning success range, which includes a learning success minimum position and a learning success maximum position, may be set, and the control unit 40 may determine that the learning has succeeded when the door 1 is positioned in the learning success range.

Figure 5:
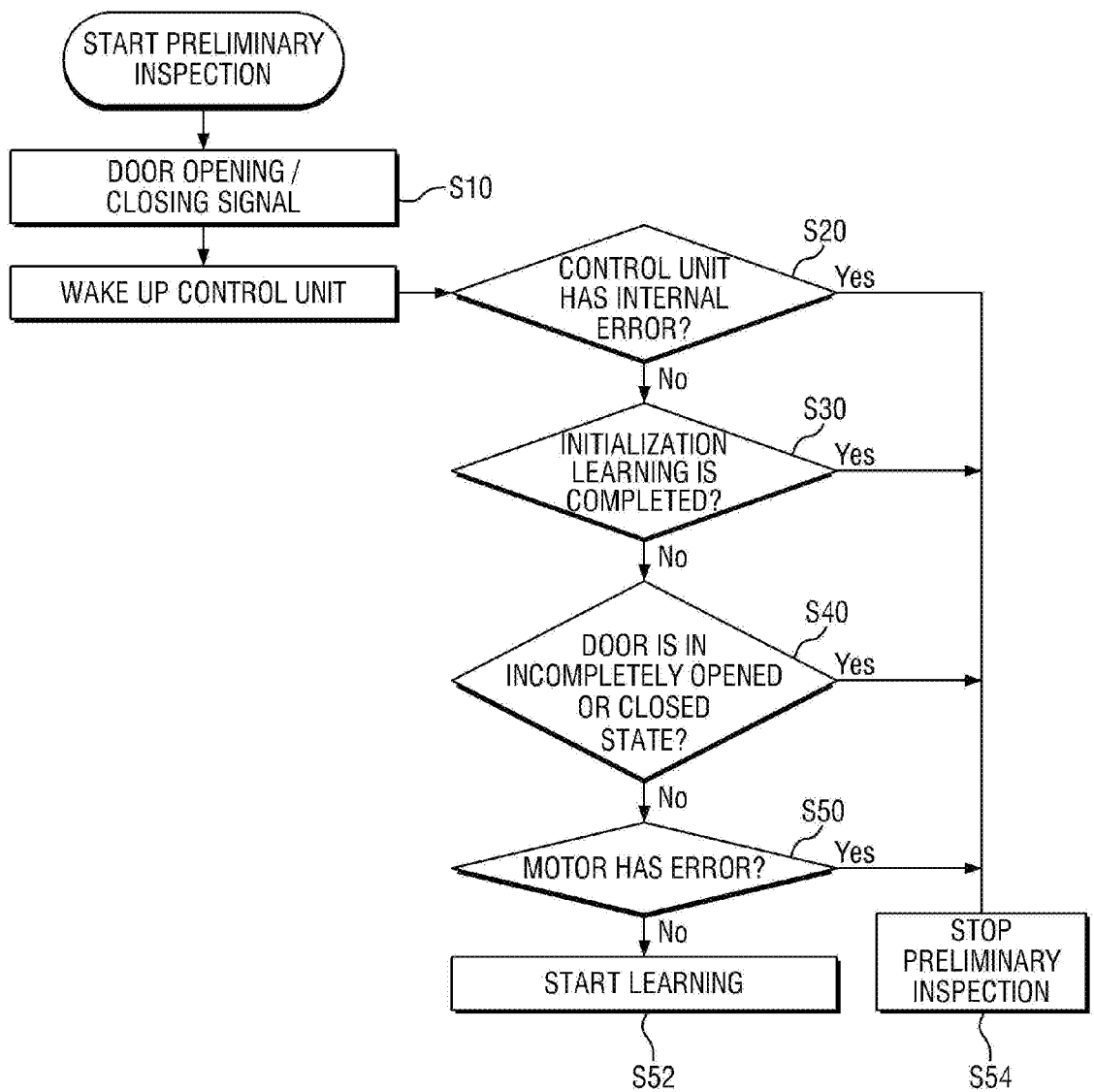
FIG. 5 is a flowchart illustrating a preliminary inspection method for profile learning for cooperative control of the dual actuator applied to the opposite sliding doors according to the exemplary embodiment of the present invention.
Figure 6:
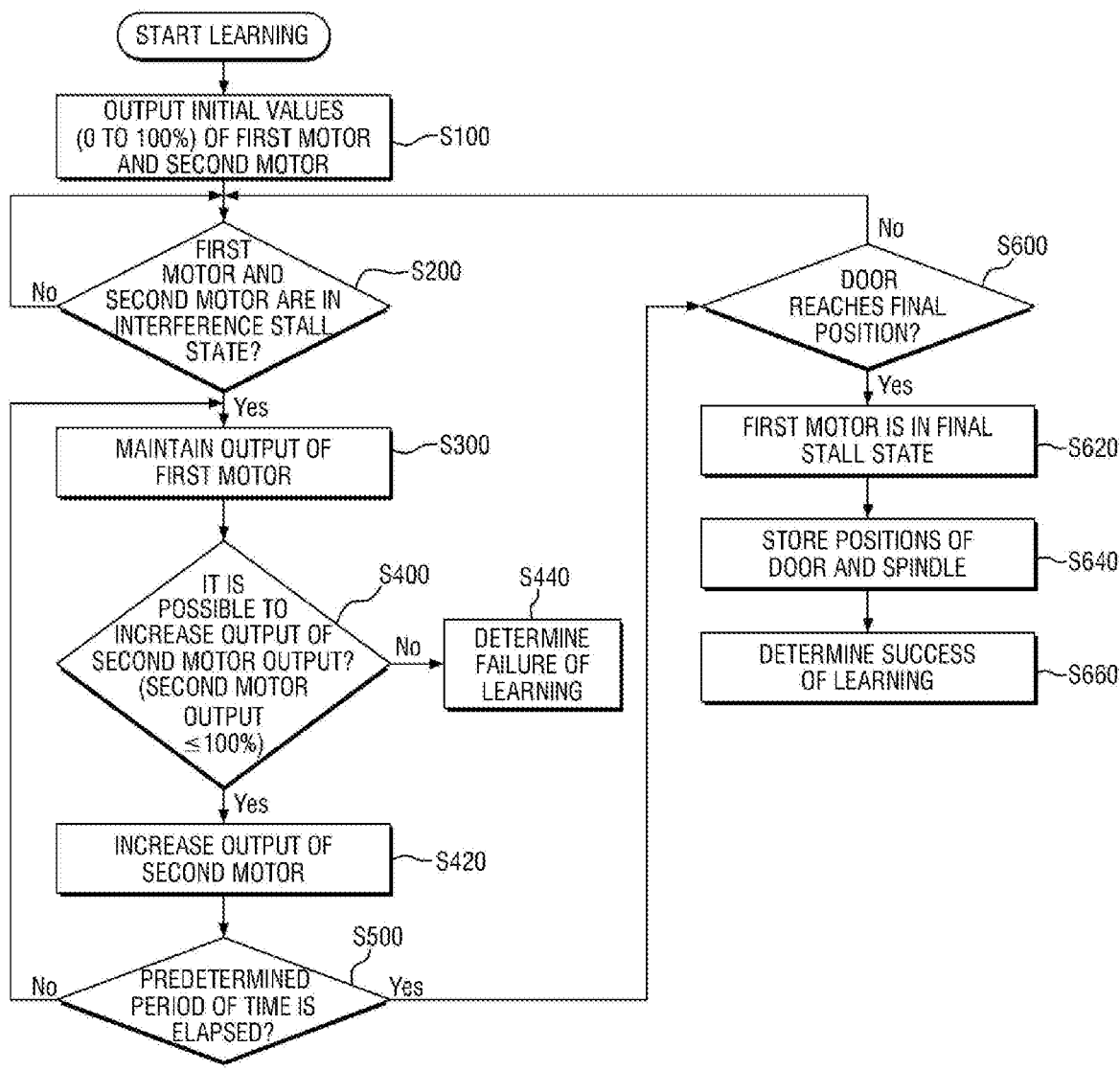
FIG. 6 is a flowchart illustrating a profile learning method for cooperative control of the dual actuator applied to the opposite sliding doors according to the exemplary embodiment of the present invention.

FIG. 5 is a flowchart illustrating a preliminary inspection method for profile learning for cooperative control of the dual actuator applied to the opposite sliding doors according to the exemplary embodiment of the present invention, and FIG. 6 is a flowchart illustrating a profile learning method for cooperative control of the dual actuator applied to the opposite sliding doors according to the exemplary embodiment of the present invention.

Hereinafter, the profile learning method of the control unit 40 will be described with reference to FIG. 5 and FIG. 6.

First, the control unit 40 may perform preliminary inspection for the profile learning. As illustrated in FIG. 5, when the door opening/closing signal is applied, the control unit 40 inspects whether an internal error occurs (S20), whether initialization learning is completed (S30), whether the door is in an incompletely opened or closed state (S40), and whether an error occurs in the first motor 27 and the second motor 28 (S50). The control unit 40 starts the profile learning (S52) when none of the conditions is satisfied, but the control unit 40 stops the preliminary inspection (S54) when any of the conditions is satisfied.

As illustrated in FIG. 6, when the profile learning is started, the control unit 40 simultaneously controls the output of the first motor 27 and the output of the second motor 28 (S100). In the instant case, the initial output of the first motor 27 and the initial output of the second motor 28 may be arbitrarily set. When an overload occurs due to a difference in stroke while the first motor 27 and the second motor 28 operate, a stall electric current is generated in the first motor 27 and the second motor 28. The control unit 40 determines the interference stall state by detecting the stall electric current (S200).

When it is determined that the first motor 27 and the second motor 28 are in the interference stall state, the control unit 40 maintains the output of the first motor 27 for a predetermined time period (S300), and adjusts the output of the second motor 28. In the instant case, the reason why maintaining the output of the first motor 27 and adjusting the output of the second motor 28 is to reduce a difference in stroke between the first motor 27 and the second motor 28. In the instant case, the control unit 40 determines whether it is possible to increase the output of the second motor 28 (S400). In a case in which it is possible to increase the output of the second motor 28, the control unit 40 increases the output of the second motor 28 by a predetermined ratio (X1%) (S420) because the second motor 28 has a smaller output capacity than the first motor 27 in the exemplary embodiment of the present invention. Accordingly, the difference in stroke between the first motor 27 and the second motor 28 is decreased such that the overload may be eliminated and the first motor 27 and the second motor 28 may operate. However, in a case in which it is impossible to increase the output of the second motor 28, that is, in a case in which the output of the second motor 28 is already 100%, the control unit 40 determines that the learning has failed (S440).

After a predetermined time period has elapsed, the control unit 40 determines whether the position of the door 1 reaches the final position (S500 and S600). When the position of the door 1 reaches the final position, the first motor 27 is in the final stall state (S620), and thus the control unit 40 detects the stall electric current and stores information related to the position of the door 1 in the memory unit 30 (S640). Accordingly, the control unit 40 determines that the learning has succeed (S660).

In contrast, when the position of the door 1 cannot reach the final position, the control unit 40 detects again whether the first motor 27 and the second motor 28 are in the interference stall state. Because the subsequent processes are the same as the above-mentioned processes, a detailed description thereof will be omitted.

Meanwhile, the predetermined time period and the rate of increase in output of the second motor 28 may be set in various ways. Furthermore, when it is determined that the profile learning has failed during the above-mentioned process, the control unit 40 performs control so that the process is performed again from the preliminary inspection for the profile learning.

Figure 7:
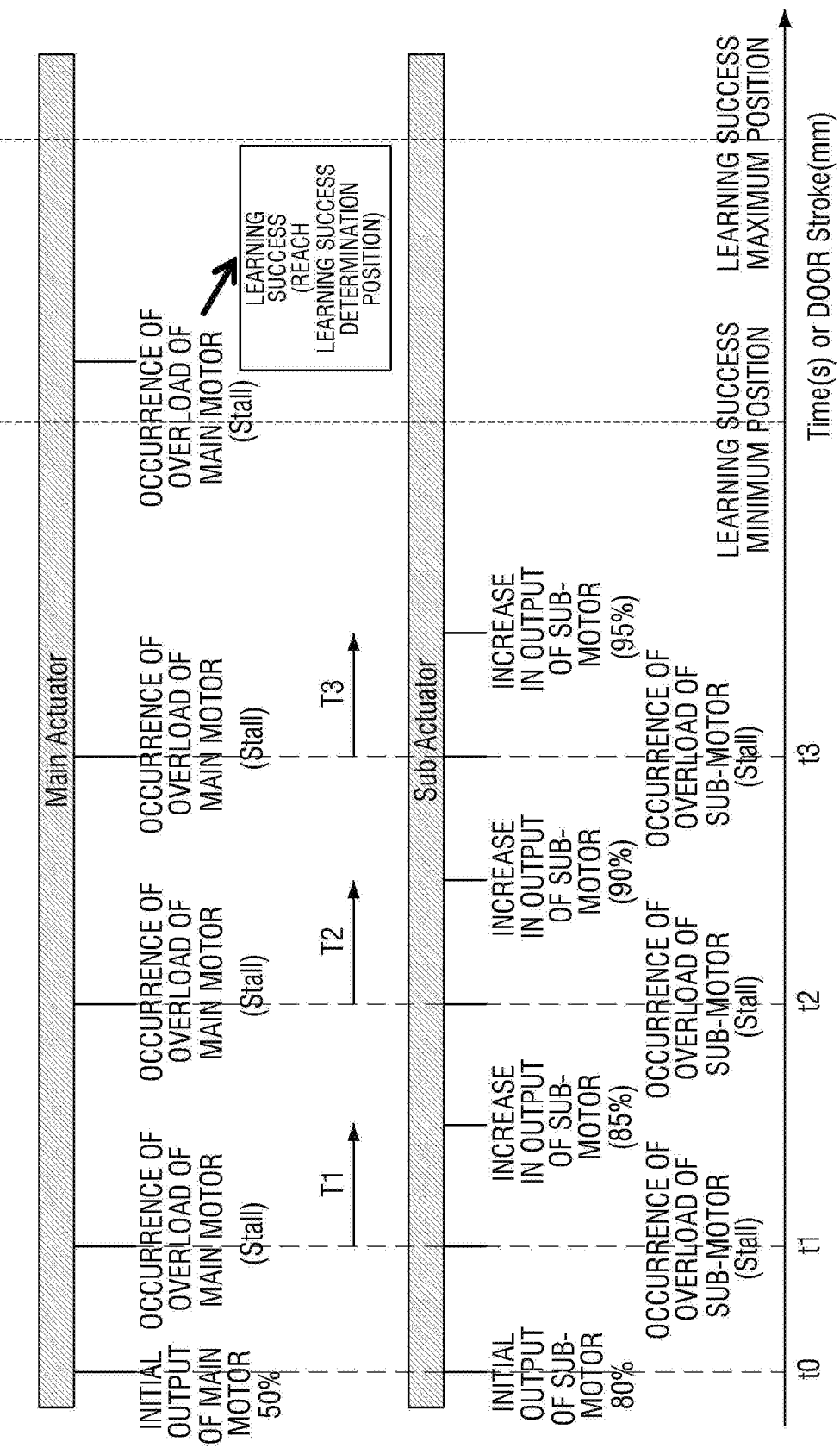
FIG. 7 is a view exemplarily illustrating a learning success case according to the exemplary embodiment of the present invention.

FIG. 7 is a view exemplarily illustrating a learning success case according to the exemplary embodiment of the present invention, and FIG. 8 is a view exemplarily illustrating a learning failure case according to the exemplary embodiment of the present invention. Meanwhile, in FIGS. 7 and 8, the horizontal axis indicates the time or the stroke of the door, but in various exemplary embodiments of the present invention, the horizontal axis is referred to as being the time axis.

Referring to FIG. 7, at t0 (an initial point in time; a point in time at the initial position), the control unit 40 sets the output of the first motor 27 to 50% (based on the overall output capacity of the first motor) and sets the output of the second motor 28 to 80% (based on the overall output capacity of the second motor). The first motor 27 and the second motor 28 go into the interference stall state at a point t1 in time while the door 1 moves along the lower rail 5. In the instant case, the control unit 40 maintains the output of the first motor 27 for a predetermined time period T1 and increases the output of the second motor 28 by 5%. Therefore, the output of the first motor 27 is 50%, and the output of the second motor 28 is 85%. In the instant case, because the door 1 does not reach the final position, the control unit 40 detects whether the interference stall state occurs again and determines whether it is possible to increase the output of the second motor 28.

Thereafter, the first motor 27 and the second motor 27 go into the interference stall state at a point t2 in time while the door 1 continuously moves along the lower rail 5. In the instant case, the control unit 40 maintains the output of the first motor 27 for a predetermined time period T2 and increases the output of the second motor 28 by 5%. Therefore, the output of the first motor 27 is 50%, and the output of the second motor 28 is 90%. In the instant case, because the door 1 does not reach the final position, the control unit 40 continuously determines whether the interference stall state occurs, and it is possible to increase the output of the second motor 27.

Since the door 1 is positioned in the learning success range while the above-mentioned process is repeated, the control unit 40 determines that the learning has succeed, and the control unit 40 stores the position of the first motor 27 and the position of the second motor 28 in the memory unit 30.

Referring to FIG. 8, at t0', the control unit 40 sets the output of the first motor 27 to 50% and sets the output of the second motor 28 to 90%. The first motor 27 and the second motor 28 go into the interference stall state at a point t1 in time while the door 1 moves along the lower rail 5. In the instant case, the control unit 40 maintains the output of the first motor 27 for a predetermined time period T1' and increases the output of the second motor 28 by 5%. Therefore, the output of the first motor 27 is 50%, and the output of the second motor 28 is 95%. In the instant case, because the door 1 does not reach the final position, the control unit 40 detects whether the interference stall state occurs again and determines whether it is possible to increase the output of the second motor 28.

Thereafter, the first motor 27 and the second motor 28 go into the interference stall state at a point t2 in time while the door 1 continuously moves along the lower rail 5. In the instant case, the control unit 40 maintains the output of the first motor 27 for a predetermined time period T2' and increases the output of the second motor 28 by 5%. Therefore, the output of the first motor 27 is 50%, and the output of the second motor 28 is 100%. In the instant case, because the door 1 does not reach the final position, the control unit 40 determines whether the interference stall state occurs, and it is possible to increase the output of the second motor 27. However, it is impossible to increase the output of the second motor 28 any further. Therefore, the control unit 40 determines that the learning has failed.

Meanwhile, although the output values of the second motor 28 are set to different values in FIGS. 7 and 8, the same value may of course be set. That is, even in a case in which the first motor 27 and the second motor 28 have the same initial output value, the success or failure of learning may vary depending on various factors such as a difference in shape of a trajectory of the door 1, a difference in learning success range, and external force applied to the door 1.

Furthermore, the term "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A profile learning system of cooperative control of a dual actuator applied to opposite sliding doors, the profile learning system comprising:
   a first position sensor configured to detect a position of a door that operates in a first direction along a rail;
   a spindle assembly including a spindle that operates in a second direction with respect to the door to prevent the door from rattling;
   first and second motors engaged to the door and the spindle assembly and configured to provide driving power to the door and the spindle assembly, respectively;
   a memory unit configured to store a position of the door; and
   a controller electrically connected to the first position sensor, the spindle assembly, the first and second motors and the memory unit and configured to adjust an output of the second motor for a predetermined time period and to determine learning success or learning failure for complete opening or closing of the door based on the position of the door when a stall state is detected due to a difference in stroke between the first motor and the second motor.

2. The profile learning system of claim 1, wherein the controller is configured to perform control to constantly maintain an output of the first motor for the predetermined time period when the stall state is detected.

3. The profile learning system of claim 1, wherein the controller is configured to perform control to increase the output of the second motor by a predetermined ratio for the predetermined time period when the stall state is detected.

4. The profile learning system of claim 1, wherein the position at which the learning success for the complete opening or closing of the door is determined is set in a range between a learning success minimum position and a learning success maximum position.

5. The profile learning system of claim 1, wherein the controller is configured to determine that the learning failure has occurred when the second motor does not produce the output in a state in which the position of the door does not reach the position at which the learning success for the complete opening or closing of the door is determined.

6. The profile learning system of claim 1, wherein the first motor goes into the stall state when the position of the door reaches the position at which the learning success for the complete opening or closing of the door is determined.

7. The profile learning system of claim 1, further including:

a second position sensor configured to detect a position of the spindle, wherein the position of the spindle is stored in the memory unit.

8. A profile learning method of controlling a profile learning system for cooperative control of a dual actuator applied to opposite sliding doors, the profile learning method comprising:

detecting an interference stall state occurring due to a difference in stroke between a first motor of the profile learning system configured to provide driving power to a door that operates in a first direction along a rail and a second motor of the profile learning system configured to provide driving power to a spindle that operates in a second direction with respect to the door to prevent the door from rattling;

maintaining, by a controller of the profile learning system, an output of the first motor for a predetermined time period and adjusting an output of the second motor when the interference stall state is detected; and determining, by the controller, learning success or learning failure for complete opening or closing of the door based on a position of the door.

9. The profile learning method of claim 8, wherein the output of the second motor is increased by a predetermined ratio after maintaining the output of the first motor for the predetermined time period.

10. The profile learning method of claim 8, wherein the controller is configured to determine that the learning success has occurred when the door is positioned in a range between a learning success minimum position and a learning success maximum position.

11. The profile learning method of claim 8, wherein the controller is configured to determine that the learning failure has occurred when the output of the second motor is not generated in a state in which the position of the door does not reach a position at which the learning success for the complete opening or closing of the door is determined.

12. The profile learning method of claim 8, further including: storing the position of the door in a memory unit of the profile learning system when the position of the door reaches a learning success position for the complete opening or closing of the door.

13. The profile learning method of claim 8, wherein the controller includes:

a processor; and a non-transitory storage medium on which a program for performing the method of claim 8 is recorded and executed by the processor.

14. The profile learning method of claim 8, wherein the profile learning system includes:

a first position sensor configured to detect a position of the door that operates in the first direction along the rail;

a spindle assembly including the spindle;

the first and second motors;

a memory unit configured to store a position of the door; and the controller electrically connected to the first position sensor, the spindle assembly, the first and second motors and the memory unit.

15. A non-transitory computer readable medium on which a program of controlling a profile learning system of cooperative control of a dual actuator applied to opposite sliding doors, the profile learning method comprising:

detecting an interference stall state occurring due to a difference in stroke between a first motor of the profile learning system configured to provide driving power to a door that operates in a first direction along a rail and a second motor of the profile learning system configured to provide driving power to a spindle that operates in a second direction with respect to the door to prevent the door from rattling;

maintaining, by a controller of the profile learning system, an output of the first motor for a predetermined time period and adjusting an output of the second motor when the interference stall state is detected; and determining, by the controller, learning success or learning failure for complete opening or closing of the door based on a position of the door.

* * * * *